United States Patent Office 3,485,772
Patented Dec. 23, 1969

3,485,772
NOVEL PROMOTERS FOR POLYESTERS
Milton Nowak, South Orange, and William Singer, Teaneck, N.J., assignors to Troy Chemical Corp., Newark, N.J.
No Drawing. Filed July 11, 1967, Ser. No. 652,422
Int. Cl. B01j *11/82;* C08g *17/14*
U.S. Cl. 252—431                               8 Claims

ABSTRACT OF THE DISCLOSURE

Stable solutions of vanadium acetylacetonate (VAA), a useful promoter in the preparation of polyester resins, are prepared by dissolving VAA in a solvent containing at least one water-miscible alcohol and water up to 40% by volume of the total solvent. Addition of acetylacetonates or other metals such as aluminum and zirconium increases stability. The resulting solutions do not discolor and show no precipitation after standing for three months.

---

This invention relates generally to polymerization. It particularly relates to novel compositions of matter useful as promoters in the preparation of polyester resins. It further relates to processes for preparation of polyester resins using the novel vanadium containing promoter compositions of this invention.

A polyester is a condensation product of a polyhydric alcohol and a polycarboxylic acid. Typical polyhydric alcohols are ethylene glycol, propylene glycol, 1,3-butanediol, pinacol, glycerol, polyglycerol, polyethylene glycol, 1,2,4-butanetriol mannitol, and the like. Typical polycarboxylic acids are oxalic acid, malic acid, succinic acid, glutaric acid, adipic acid, furamic acid, maleic acid, tricarballylic acid, and the like. Preferably, the dihydric alcohols and the dicarboxylic acids are used in the preparation of the polyesters. The polyesters may be modified by including in the condensation reaction mixture monohydric alcohols such as ethanol, butanol, hexanol, and the like and monocarboxylic acids such as butyric, octanoic, lauric, myristic, and the like. It is also possible to use other modifying agents for the polyesters, as desired. However, the term polyester as used herein does not include matter commonly known as alkyds, which are polyesters modified by fatty acids and drying oils.

Unsaturated polyesters, i.e. polyesters of polyhydric alcohols and polycarboxylic acids containing non-aromatic unsaturation, for example, acids such as fumaric and maleic acids, may be further cross linked or copolymerized with unsaturated copolymerizable monomer in the presence of both a catalyst and a promoter. In this specification the terms catalyst and promoter will be defined in the same manner as they are used in the plastics industry.

Catalysts are used in the plastics industry to take part in the various reactions, and are consumed in the process. These substances, which are usually peroxides, initiate the polymerization reaction by the formation of free radicals in the presence of unsaturation (carbon to carbon double bonds) to cause polymerization. Catalysts which are used include benzoyl peroxide, methyl ethyl ketone peroxide (referred to hereinafter as MEKP), cyclohexanone peroxide, cumene hydroperoxide, lauroyl peroxide, tertiarybutyl peroxide, dichlorobenzoyl peroxide, and the like.

Promoters are compounds which are used to accelerate the action of the catalyst. If a promoter is not used, the polymerization may occur, but may take an impracticably long time to reach the desired degree of polymerization. The promoters may include cobalt naphthenate, cobalt 2-ethylhexoate, manganese naphthenate, manganese 2-ethylhexoate, phenylphosphinic acid, n-butyl sulfite, diethyl aniline, 1,2-propylenediamine, and the like. Although promoters may include both metallic and certain non-metallic organic compounds, this invention is concerned primarily with metallic and organo-metallic compounds.

Polyesters are generally used as molding compositions, or in a process known as wet layup. In the former, the use of promoters may or may not be used. However, if a promoter is not used, the application of heat is necessary.

In the wet layup process heating is impractical, and it is necessary to obtain curing at room or ambient temperatures. Promoters are essential for room temperature curing, and in carrying out this process a promoter-catalyst system of cobalt octoate and MEKP has been used. Although efficient, such a system has its disadvantages. The cobalt imparts to the cured or polymerized resin a distinctive bluish-pink color which may not be desirable. The peroxide because of its high reactivity is highly inflammable and poses a distinct fire hazard. This system is also at least partially inactivated by the presence of water in the polyester composition. It is, therefore, most desirable to use a promoter-catalyst system that imparts little color to the final product, and is not inactivated in the presence of moisture. Preferably, the catalyst itself should not be a hazardous substance. In addition, because of its expense, the use of MEKP is not particularly desirable in a competitive market.

Metals other than cobalt have been used as promoters, but with only marginal success. Manganese can be employed as manganese naphthenate, or manganese octoate, but these promoters do not accelerate the reaction as well as the cobalt salts. Furthermore, manganese salts also impart a definite dark color to the polymerized product.

Among the other metals which have been used, one which has been found to have a certain degree of utility is vanadium. More recently a number of metals have been investigated for their effect as promoters with the polymerization of polyesters. These metals include: copper, manganese, iron, titanium, aluminum, beryllium, nickel, zinc, lead, calcium, cerium, zirconium, barium, mercury, tin and vanadium.

Of all the metals tested, only vanadium in both vanadic and vanadyl states had some utility as a promoter. Certain combinations of these metals which have been tested show that the acetylacetonates (AA) of the more active metals are to be preferred to the long chain fatty acid salts because the AA's demonstrate considerably more activity as promoters. Several problems do arise, however, in the use of the active AA's; the primary problem is to have the compound in a composition suitable for use in commercial polyester polymerization.

It is necessary that a commercial product of this type be in a liquid composition which will dissolve in or be completely miscible with the polyester resin solution. Use of a dry powder material is completely unsatisfactory and impractical, as it requires mixing equipment and a prolonged length of time for the mixing. Besides, the AA may not be satisfactorily soluble in the system. Use of dry powder also results in a local polymerization and the formation of excessively gelled particles, together with a surrounding solution of incompletely polymerized resin. Mixing of a powdered metal AA may also be hazardous when in contact with peroxide at the high local concentrations. Furthermore, rapid agitation is also undesirable as it will entrap air and cause bubbles as well as retard the reaction.

It is, therefore, an object of this invention to develop a solution of a metal AA so that it can be incorporated easily and safely in the polyester solution.

It is another object of this invention to develop a metal AA solution that will be stable over reasonable periods of time.

It is a further object of this invention to provide a useful commercially suitable solution of vanadium acetylacetonate (VAA), where VAA refers to both vanadic and vanadyl acetyl acetonate, as promoter in the polymerization of polyester resins.

It is known that although a number of solvents exist for VAA, possibly because of the reactivity of the metal, solutions of VAA in these solvents eventually deteriorate, turning from the original clear blue-green color to a brown color followed by the subsequent formation of a precipitate. Solvents such as cellosolve, methanol, diacetone alcohol and chloroform can all be used to dissolve suitable amounts of VAA, but the resulting solutions are unstable. Use of solvents of the highest purity did not improve the stability of these solutions.

It has been discovered that the presence of small amounts of water in the solution, together with the presence of certain other metal AA's provide a product of adequate stability and prolonged activity. It has been unexpectedly found that the stability of the VAA is markedly improved by the addition of appreciable amounts of water, and that moreover, the improvement in stability is further enhanced by the presence of certain other metal AA's. This is entirely contrary to what might be predicted, since the addition of water to anhydrous alcohol or to an ether alcohol such as ethylene glycol monoethyl ether definitely reduces the solvent power with respect to alcohol soluble-water insoluble materials. It is not only unexpected that addition of up to about 40% of water to the alcohol or ether alcohol did not reduce its solvent properties, but it was also not anticipated that the resulting solution would be of vastly improved stability, and would not be subject to deterioration, nor subsequent precipitation upon aging.

In accordance with this invention there is provided a stable solution of a promoter which can be stored for long periods of time without deterioration, and which will act effectively as a promoter in polyester resin systems. This solution comprises VAA dissolved in one or more alcohols and water. The vanadium in the VAA may be in the vanadic or vanadyl form, or both forms may be used.

The alcohol may be either mono or polyhydric and may contain ether linkages. It is desirably water-miscible, but certain water-immiscible alcohols such as butanol or cyclohexanol may be used. Suitable alcohols include methanol, ethanol, isopropanol, ethylene glycol, glycerol, propylene glycol, ethylene glycol monoethyl ether (cellosolve), diacetone alcohol and the like.

The amount of water in the solution is up to about 40% by volume of the total solvent, with about 2-30% being preferred.

The concentration of VAA in the solution is from about 0.1 to 5.0% by weight, preferably 0.1 to 2.5%.

It may be desirable to add one or more other metal AA's, such as aluminum AA and zirconium AA to the solution in amounts of 0.1 to 12%.

The solutions are readily prepared by adding desired amounts of VAA and other metal AA's to a solvent comprising the alcohol and water in desired ratio. The materials used in the preparation of the solutions are available commercially or they may be prepared as needed, by standard procedures known to the art.

In preparing the cured polyester resins the promoter composition is added to a polyester preparation and the mixture stirred until it becomes homogeneous. A suitable catalyst is then added and the mixture again stirred till homogeneous. The order of addition of these materials may be reversed. Complete gelation takes place in a few minutes to an hour or more, depending on the catalyst used and levels of addition of compounds.

In addition to the unexpected stability of the solutions, excellent promoter activity was shown by the solutions despite the presence of water, although it has been known in the technique of the polyester polymerization that the presence of water has a definite inhibitory effect. Indeed, there are many references in technical literature to this phenomenon. For example, Svoboda, in his paper Redox Polymerization of Unsaturated Polyester Resins III. Catalytic Properties of Tertiary Amine N-Oxides. Redox Polymerization with the System Dimethylaniline N-Oxide with Vanadyl Acetyl Acetonate. (Journal of Polymer Science: part A, vol. 2, pp. 2729-2733 (1964) states on 2732 that "work in the laboratory has confirmed the inhibitory effect of water upon polymerization of unsaturated polyester systems.")

Another very valuable advantage of these solutions is the fact that they will function with cumene hydroperoxide as catalysts instead of MEKP, thereby permitting the use of a cheaper and safer catalyst. Another advantage of a product of this invention is the fact that color of the polymerized resin is a pale yellow instead of a dark brown color resulting from the use of manganese or the purple-pink color resulting from the use of the cobalt.

Moreover, the color derived through the use of the product of this invention has a very low tinctorial strength, so that in thin sections the polymerized product appears to be essentially colorless, and relatively small amounts of pigment or dye can be used to attain the desired color without undesirable hues or tints added by such promoters as cobalt or manganese.

A better understanding of the invention and of its many advantages will be had by referring to the examples which follow. These examples are given by way of illustration only and are not to be construed as limiting.

Examples 1-9 illustrates the preparation of promoter compositions coming within the scope of the invention and the advantageous properties of these compositions in comparison with promoter compositions outside the invention.

EXAMPLE 1

(A) A solution of 1 g. vanadium AA, 3 g. zirconium AA and 1 g. aluminum AA in 78 g. of anhydrous ethanol was prepared by dissolving the dry powdered products in ethanol at 120° F. The solution immediately after preparation is a greenish-brown color, which becomes completely brown on standing overnight in a sealed container at room temperature.

(B) A similar solution of 1 g. VaAA, 3 g. ZrAA and 1 g. AlAA was prepared in a combination of 78 g. of 91% ethanol and 9% water. The solution immediately after preparation was a bright clear green, and remained so after storage of two weeks in a sealed container at room temperature.

It has been found that when a solution of vanadium AA turns brown in color, it is a sign of deterioration. Such brown solutions always develop a precipitate upon prolonged storage and cannot therefore be used for commercially acceptable polyester promoters.

EXAMPLE 2

(A) A solution of 1.25 g. of VAA in 98.75 g. of ethylene glycol monoethyl ether was prepared by stirring the dry powdered VAA in the solvent for ½ hr. at 130° F.

Immediately after preparation the solution had a green-brown color. After storage for five days at room temperture in a sealed container, the solution turned to a brown color, and after another six days showed a slight precipitate.

(B) A solution of 1.25 g. of VAA in 98.75 g. of a solvent consisting of 90% ethylene glycol monoethylether and 10% water was prepared as in Example 2(A).

The solution immediately after preparation was a clear bright green, which was unchanged in appearance after storage for three months at room temperature in a sealed vessel.

EXAMPLE 3

(A) A solution of 1 g. of VAA in 99 g. of diacetone alcohol was prepared by mixing the two components at 125° F. for one hour. The solution as formed is a clear green liquid.

After storage in a sealed container for 24 hours, a considerable amount of crystals were deposited from solution.

(B) A solution of 1 g. of VAA in 99 g. of a solvent consisting of 91% diacetone alcohol and 9% water was prepared as in Example 3(A).

The solution as formed was a clear light green liquid which remained unchanged in appearance after storage of three months in a closed container at room temperature.

EXAMPLE 4

A solution of VAA was prepared using chloroform as a solvent as is mentioned in the literature. The solution was prepared by disolving 1.25 g. of VAA in 98.75 g. of chloroform. The original appearance of the solution is a clear green liquid. On storage at room temperature in a sealed vessel, the solution turned brown after four days and exhibited a voluminous sludge after one week.

Other solvents were tried and proved to be ineffective or to yield solutions which were unstable (precipitated within a week or less) included:

Chlorobenzene—Dissolves, but precipitates.
Benzene—Dissolves, but precipitates.

As indicated previously, water effects a marked improvement in the stability of vanadium AA dissolved in water immiscible alcohols and alcohol ethers.

An additional improvement in stability is afforded by use of aluminum AA or zirconium AA in Examples 5–7.

EXAMPLE 5

(A) A solution of 1 g. VAA in 82 g. of a solvent consisting of 50% methanol and 50% cellosolve was prepared by agitation of the components at 115° F. When solution was complete, it consisted of a clear green liquid. On storage at room temperature, the solution turned brown and deposited a sludge after six days.

(B) A solution of 1 g. VAA in 82 g. of a solvent consisting of 45% cellosolve 45% methanol and 10% water was prepared as in Example 5(A).

The solution, a clear green liquid, turned brown after two days but showed no precipitation nor sludge for two weeks.

(C) A solution of 1 g. VAA and 1 g. aluminium AA in 81 g. of a solvent consisting of 50% methanol and 50% cellosolve was prepared as in Example 5(A). The solution, a clear green liquid turned brown and deposited a sludge in two days storage at room temperature.

(D) A solution of 1 g. VAA and 1 g. aluminum AA in 81 g. of a solvent consisting of 45% methanol, 45% cellosolve and 10% water was prepared as in Example 5(A).

The product, a clear green liquid, remained stable and unchanged after storage of three months at room temperature.

Comparison of Examples 5(C) and 5(D) shows the improvement of the stability due to water.

Comparison of Examples 5(B) and 5(D) shows the effect of the aluminum on stability.

EXAMPLE 6

(A) A solution of 1 g. VAA and 3 g. zirconium AA were dissolved in a solvent consisting of 79 g. of 45% methanol, 45% cellosolve, and 10% water by agitating the dried powdered metal salts in the solvent at 110° F. till solution was complete. The product, a clear green solution remains unchanged for at least three months.

When water was omitted from the solvent, the solution turned brown after one week.

EXAMPLE 7

(A) A solution of 1 g. VAA and 3 g. zirconium AA and 1 g. of aluminum AA in 78 g. of solvent consisting of 45% methanol, 45% cellosolve, and 10% water was prepared by stirring the dry powdered metal salts in the solvent at 115° F.

When solution was complete, the product was a clear blue-green liquid that still remained stable and unchanged for three months.

When water was omitted from the solvent, the solution turned brown after one week.

EXAMPLE 8

(A) A solution of 1 g. VAA, 3 g. zirconium AA and 1 g. aluminum AA in 78 g. cellosolve was prepared by stirring in the dried metal salt powders at 130° F.

The solution formed was a dark olive-drab color, which showed precipitation within twenty-four hours.

(B) A solution as in Example 8(A) was prepared using a solvent composed of 90% cellosolve and 10% water. The product, a clear green solution, remained stable and unchanged after standing for three months.

(C) A solution as in 8(A) was prepared using a solvent composed of 85% cellosolve and 15% water. The product was a clear green liquid which still remained stable and unchanged after storage for three months.

(D) A solution as in Example 8(A) was prepared using a solvent composed of 70% cellosolve and 30% water. The product was a clear green solution which still remained stable and unchanged after standing for three months.

EXAMPLE 9

(A) A solution of 1 g. of vanadium AA, 3 g. zirconium AA and 1 g. aluminum AA in 45 g. of a solvent consisting of 50% cellosolve and 50% methanol, was prepared by mixing the dry powdered metal salts in the solvent at 120° F.

A solution was obtained which was brown-green in color and showed heavy precipitation overnight.

(B) A solution as in Example 9(A) was prepared using 45 g. of a solvent consisting of 45% cellosolve, 45% methanol, and 10% water.

A clear green solution containing 10% by weight of metal chelates was obtained. This solution remained clear and stable after standing for three months.

The remaining examples illustrate the efficiency of the promoter compositions of this invention for the room temperature cure of polyester systems. The results obtained with control promoter-catalyst system containing cobalt octoate and MEKP are described in Examples 10, 15, 16, and 17(A). The detrimental effect of water on this system is well illustrated in Example 16. The remaining examples describe the curing using VAA promoter compositions.

EXAMPLE 10

To 100 g. of a commercial polyester (Polylite 8001—Reichhold Chemicals, Inc.) was added 0.5 g. cobalt octoate containing 6% cobalt metal. The compound was stirred until homogeneous and 1.0 g. of MEKP/60% solution in dimethyl phthalate was added. The compound was stirred again and the time for gelatin to occur was thirty minutes. The gelled resin was dark pink in color.

EXAMPLE 11

To 100 g. of Polylite 8001 was added 2.0 g. of a 1% freshly prepared solution of VAA in ethylene glycol monoethyl ether. The mixture was stirred until homogeneous and 1.0 g. of cumene hydroperoxide was added. The compound was stirred again and the time of gelation was thirty minutes. The gelled resin was a pale yellow-green in color.

EXAMPLE 12

To 100 g. of Polylite 8001 was added 2.0 g. of a 1% 3 months old solution of VAA in a solvent mixture consisting of 90% ethylene glycol monethyl ether and 10% water. The mixture was stirred until homogeneous and 1.0 of cumene hydroperoxide was added. The compound was stirred again and the time of gelation was twenty-five minutes. The gelled resin was pale yellow-green in color. Examples 11 and 12 illustrate the fact that water introduced into the polyester by way of the promoter solution does not affect gellation time.

EXAMPLE 13

To 100 g. of a commercial polyester (Polylite 8039—R. C. I.) was added 0.5 g. of a solution consisting of 1 g. of VAA, 3 g. zirconium AA and 1 g. of aluminum AA in 78 g. of a solvent containing 45% ethylene glycol monoethyl ether, 45% methanol, and 10% water. The mixture was stirred until homogeneous and 1.0 g. of cumene hydroperoxide was added. The compound was stirred again and the time of gelation was twenty-five minutes.

EXAMPLE 14

To 100 g. of Polylite 8039 was added 1 g. water and the same additions were made as in Example 13 above. The time of gelation was twenty minutes. Examples 13 and 14 illustrate as Examples 11 and 12, the fact that water does not have a detrimental effect on the cure of the polyester resin when used with the novel promoter solutions of this invention.

EXAMPLE 15

To 100 g. of Polylite 8039 was added 0.5 g. of cobalt octoate solution containing 6% metal. The mixture was stirred until homogeneous and 1 g. MEK peroxide/60% was added. The mixture was stirred again until homogeneous and the time of gelation was thirty minutes. The polymerized product was a dark pink-purple in color.

EXAMPLE 16

To 100 g. of Polylite 8039 was added 1 g. of water. The additions of Example 15 were made and the time of gelation was one hundred and forty minutes.

EXAMPLE 17

(A) The following commercial polyester resins (100 g.) were gelled through the use of 1 g. MEK peroxide catalyst (60% solution in dimethyl phthalate) and the following quantities of cobalt octoate (60% cobalt) to achieve a gelation time of thirty minutes.

Quantity of cobalt octoate needed

| Resin: | g. |
|---|---|
| RCI Polylite 31–000 | 0.5 |
| RCI Polylite 33–011 | 0.5 |
| RCI Polylite 31–001 | 0.65 |
| RCI Polylite 31–284 | 0.3 |

(B) The same resins as in part (A) were gelled through the use of 1 g. cumene hydroperoxide and the following quantities of a promoter solution consisting of 1 g. of VAA and 2.5 g. zirconium AA in 65 g. of a solvent consisting of 90% ethylene glycol monoethyl ether, and 10% water, to achieve a gelation time of thirty mnutes.

Quantity of promoter needed

| Resin: | g. |
|---|---|
| RCI Polylite 31–000 | 0.25 |
| RCI Polylite 33–011 | 0.40 |
| RCI Polylite 31–001 | 0.40 |
| RCI Polylite 31–284 | 0.25 |

(C) The same resins as in part (A) were gelled through the use of 1 g. cumene hydroperoxide and the following quantities of a promoter solution consisting of 1 g. VAA, 3 g. zirconium AA and 1 g. aluminum AA in a solvent consisting of 71 g. Cellosolve and 7 g. water, to achieve a gelation time of thirty minutes.

| Resin: | Quantity of promoter needed, g. |
|---|---|
| RCI Polylite 31–000 | 0.25 |
| RCI Polylite 33–011 | 0.40 |
| RCI Polylite 31–001 | 0.40 |
| RCI Polylite 31–284 | 0.25 |

What is claimed is:

1. A promoter composition in solution form for use in the preparation of polyester resins consisting of a solvent containing at least one water-miscible alcohol and water in an amount up to 40% of the total volume of solvent and from about 0.1 to 5.0% by weight of vanadium acetylacetonate.

2. A promoter composition according to claim 1, wherein the water is in amount from about 2 to 30% of the total volume of solvent.

3. A promoter composition according to claim 2, wherein the water-miscible alcohol is ethylene glycol monoethyl ether.

4. A promoter composition according to claim 1, wherein the solvent contains by volume, 45% methanol, 45% ethylene glycol monoethyl ether and, 10% water.

5. A promoter composition according to claim 4, which contains 0.1 to 2.5% by weight of vanadium acetylacetonate.

6. A promoter composition in solution form for use in the preparation of polyester resins which comprises a solvent containing at least one water-miscible alcohol and water in an amount up to 40% of the total volume of solvent and from about 0.1 to 5.0% by weight of vanadium acetylacetonate and from about 0.1 to 12.0% by weight of aluminum acetylacetonate.

7. A promoter composition in solution form for use in the preparation of polyester resins which comprises as solvent containing at least one water miscible alcohol and water in an amount up to 40% of the total volume of solvent and from about 0.1 to 5.0% by weight of vanadium acetylacetonate and from about 0.1 to 12.0% by weight of zirconium acetylacetonate.

8. A promoter composition in solution form for use in the preparation of polyester resins which comprises a solvent containing by volume 45% methanol, 45% ethylene glycol monoethyl ether and 10% water, and containing 0.1 to 2.5% by weight of vanadium acetylacetonate, 0.1 to 12.0% by weight of aluminum acetylacetonate, and 0.1 to 12.0% by weight of zirconium acetylacetonate.

References Cited

UNITED STATES PATENTS 3,333,021  7/1967  Geipert _____ 260—863

FOREIGN PATENTS 1,070,819  12/1959  Germany.

OTHER REFERENCES

Inorganic Synthesis, vol. V, 1957, pp. 105–116.

DANIEL E. WYMAN, Primary Examiner

P. M. FRENCH, Assistant Examiner

U.S. Cl. X.R.

260—75